R. ROWLEY.
TIRE SHOE VULCANIZING APPARATUS.
APPLICATION FILED MAR. 17, 1910.
979,889.
Patented Dec. 27, 1910.
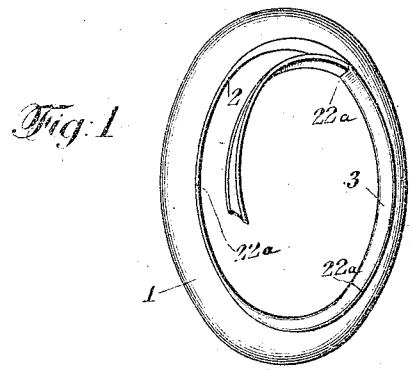
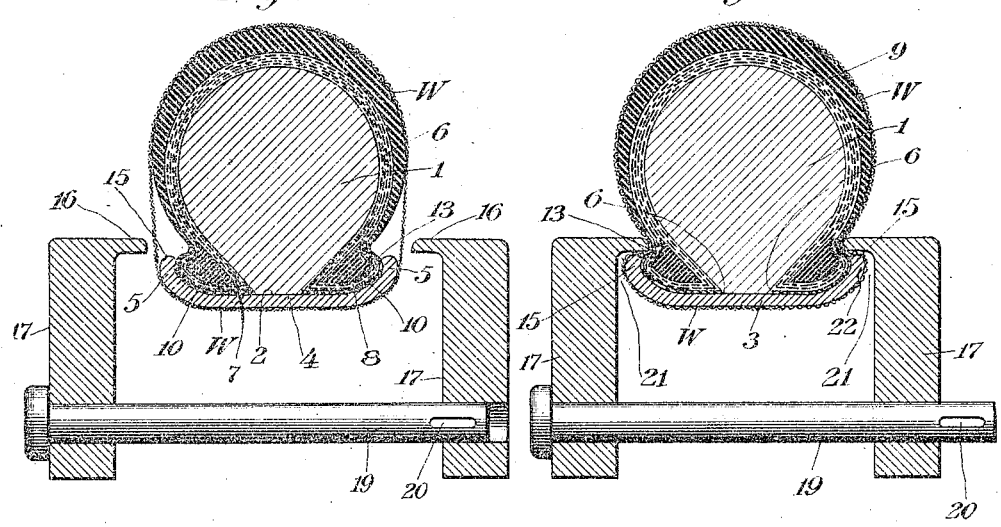
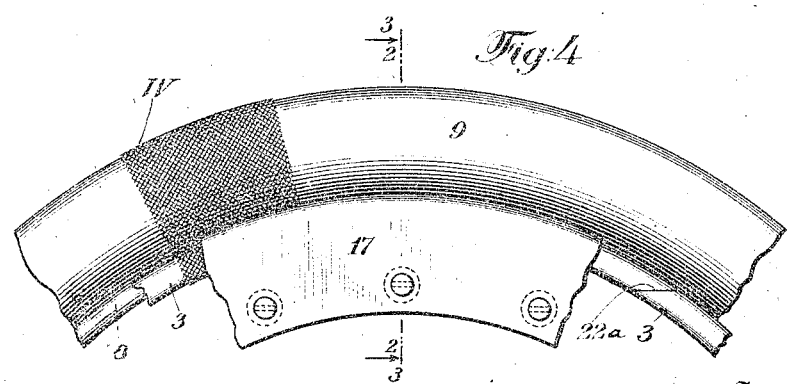
Witnesses:
F. G. Nares.
G. Blake.
Inventor
Robert Rowley,
By his Attorneys,
Edward T. Black

UNITED STATES PATENT OFFICE.

ROBERT ROWLEY, OF NEW YORK, N. Y.

TIRE-SHOE-VULCANIZING APPARATUS.

979,889.

Specification of Letters Patent. Patented Dec. 27, 1910.

Application filed March 17, 1910. Serial No. 549,965.

*To all whom it may concern:*

Be it known that I, ROBERT ROWLEY, citizen of the United States, residing at New York city, in the county of New York and State of New York, have invented certain new and useful Improvements in Tire-Shoe-Vulcanizing Apparatus, of which the following is a specification, reference being had therein to the accompanying drawings.

This invention is a new form of apparatus for use in practicing the open-cure vulcanization method of making shoes for automobile and other vehicle tires set forth in Rowley and Coomber's application for United States Letters-Patent Serial No. 511,188, filed August 4, 1909, and allowed December 20, 1909, in respect to that feature in said method which is limited to shoes having marginal beads and adjacent clencher edges, and which, in substance, is as follows:—

The method of making vulcanized tire shoes having marginal beads and adjacent clencher grooves, consisting in securing and supporting the shoe, in form, interiorly upon a mandrel, and, exteriorly, between the toe and heel of each bead, upon bead-supports, leaving the tread, sides, grooves and bead heels exposed; in compressively wrapping a fibrous binder tubularly about and circumferentially around the exposed tread, side and heel surfaces of the shoe, across the mouths of the clencher grooves, and the exposed walls of the bead supports to hold the shoe, the mandrel and the bead supports in place and to hold the binder across the mouths of the clencher grooves; in compressively straining the binder over the tread and side walls of the shoe and pressing it into and upon the walls of the clencher grooves; and in subjecting the shoe so supported, bound and compressed to vulcanizing heat.

The "open cure" method of vulcanizing both "clencher" shoes and also "mechanically fastened" tire-shoes is very old, and is shown not only in French Patent No. 351,021 of 1905, but in other patents hereinafter mentioned. I here note that for some years prior to the hereinafter mentioned Patent No. 822,561, it was common practice, in repairing tire-shoes, to split a clencher tire-shoe wheel rim in two, circumferentially, and use it in connection with a shoe-supporting mandrel and winding fabric for open cure vulcanization.

I am aware of United States Letters-Patent No. 822,561; No. 901,006; No. 901,007; No. 858,046; No. 882,341 and No. 911,182, and disclaim all that is shown in them. In none of these patents are the carcass, its rubber covering and inner peripheral device for supporting the carcass and its covering in relation to the annular mandrel, wrapped so that compression applied to the sides of the wrapping at and near the clencher grooves draws or stretches the exterior rubber covering upon the carcass, and holds it compressed there for the vulcanizing operation, as in accordance with said method.

I am also aware that in the manufacture of tire shoes of the type shown in Jeffery's U. S. Patents No. 614,393 and No. 615,454 of 1898, the shoes were wrapped, wrong side out, on mandrels, and being so wrapped, were vulcanized by means of "an open heat", that is, by live steam in direct contact with the rubber.

I am also aware that in the process of making tires patented by Cole's U. S. Patent No. 696,391 of 1902, the clamping margins of the shoe, after mounting the shoes on an annular mandrel or core, have been customarily clamped by and between side pressure rings (the core having an interior peripheral rib to limit the inward or clamping movement of the rings), and the shoe left exposed from about half-way up one side, over the tread or crown, to about half-way down the other side. The so assembled side pressure or clamping rings and shoe have then been exteriorly wrapped, and the vulcanization effected by the so-called "open cure". The use of such side clamping rings has occasioned lateral shoulders extending around the opposite sides of the tire at about the line indicated in white, below the word "Fisk" in the cut of the Cole patent tire shown on p. 51 of Pearson's "*Rubber Tires and All About Them*," published at New York by the India Rubber Publishing Co., 1906; and these shoulders are objectionable because in their formation, while the rubber is unvulcanized, the rubber at the shoulder is pushed up and loosened in its relation to the duck of the carcass, as above explained.

The said application of Rowley and Coomber shows apparatus for practicing the method therein referred to, but such apparatus is unduly expensive to manufacture, and is unduly cumbersome to handle. Two bead-supporting rings are used, and they are castings that have to be finished in a turning lathe. The mandrel is formed with an internal, annular rib; and there are a pair of side wrapping compression annuli. By the present invention, I eliminate the interior rib on the mandrel, reducing its expense and weight and making it more convenient to handle. For the two bead-supporting rings, each requiring to be cast and lathe-turned, and to be separately handled in assembling for use, I substitute a transversely solid bead-support that is made in a plurality of complementary parts adapted to fit the inner wall of the mandrel, the members having outwardly extending but not clencher groove engaging flanges. This segmental, transversely solid, bead-supporting ring may be rolled accurately and therefore very economically to shape, and is very conveniently assembled with the mandrel and shoe before the wrapping-compression rings are mounted in place.

In the accompanying drawings, illustrating my new apparatus, Figure 1 is a perspective view showing a shoe-supporting, annular mandrel with two segmental members in place within the annular mandrel and a third member out of place. Fig. 2 is a cross-sectional view at line 2—2 of Fig. 4, of the complete apparatus with a shoe and tubular, fibrous wrapping in place, tubularly inclosing the exposed portion of the shoe and the bead-supporting ring and crossing the mouths of the clencher grooves. The wrapping-compression rings are shown in position of initial contact with those parts of the tubular, fibrous wrapping that cross said mouths. Fig. 3 shows the same parts as are illustrated in Fig. 2, in the position which they have when the wrapping compression-plates have been forced inwardly into the clencher grooves, preparatory for the open cure in vulcanizing apparatus. Fig. 4 is a partial side elevation of what is shown in Fig. 3.

Referring to the drawings, 1 is the annular mandrel having, preferably, a flat bearing surface 2 around its inner periphery, midway between the outer projection of the sides of the mandrel, which is usually more or less round or oval in cross-section. The bead-supporting ring 3, composed of a plurality of segments butt-jointing one with the other when in place, has a preferably flat formed portion 4 midway between its outwardly projecting edge-flanges 5, 5, said portion 4 being adapted to fit on the bearing surface 2 of the mandrel and to form at each side of the bearing surface sharp or uniformly defined corners 6, 6 between the inner surface of the channel of the ring 3 and the lateral, outwardly extending wall portions 7, 7 of the mandrel. It is in these corners that the corresponding edges of the clencher beads 8 of the shoe 9 rest during the open cure, and wherein the bead edges are formed. It is important that these edges should be uniformly finished, and not be ragged or irregular. The inner wall portions 10, 10 of the channel of ring 3 are curved outwardly to support the corresponding surfaces of the tire beads 8, 8, but terminate in line with the heels 13, 13 of the tire beads, their inner margins not inclining inwardly so as to interfere with the ready assemblage of the tire beads 8, 8 with the rings 3, as would be the case if the flanges 5, 5 curved inwardly at their outer edges as in an otherwise similar clencher wheel-rim. The outer edges 15, 15 of the flanges 5, 5 come under the inturned wrapping-engaging flanges 16, 16 of the laterally disposed, wrapping-engaging rings 17, 17, with space for the wrapping W between them. That is, the inner extension of the annular flanges 16 is sufficient to permit them to be moved inwardly against the portions of the wrapping between them and the ring surfaces 15, when the rings or plates 17 are moved inwardly to strain the tubular, fibrous wrapping (usually wound spirally in place when damp, and self-sustaining in wrapped position,) tightly over the otherwise exposed surfaces of the shoe bead and sides and to force the wrapping against the walls of the clencher grooves of the shoe and thereby secure for them the same durable and efficient open cure that is secured for the said outward surfaces of the shoe. This is very important, in order to secure durability for the shoe and to eliminate the production of "seconds"; that is, imperfectly vulcanized shoes common to those processes by which the walls of the clencher grooves are covered by metal through which the vulcanizing heat passes. The side plates or rings 17 may be moved laterally by any convenient devices, and have transverse bolts 19 and keys 20 therefor. The annular flanges 16 are not arrested in their inner movement by any mechanical parts, in order that the full wrapping compression force exerted on the rings may be transferred through the wrapping to the elastic material of the shoe beads, which alone arrests the inward wrapping compression movement of the side rings. Hence the inner faces 21 of the rings are preferably out of contact with the sides 22 of the bead-supporting rings when the side rings have been forced inwardly as far as possible with the shoe in place. I accordingly prefer to make the lateral flanges 16 of the side-rings of a depth exceeding the thickness of the flanges 5 of the bead-supporting rings plus the maximum depth of the clencher grooves in the shoe, in order that the inward movement of the side rings may not be arrested in any event otherwise than by the material compressed. The bead-supporting ring is best cut into a plurality of segments by transverse diagonal cuts 22ª, each preferably slanting outwardly toward the outer periphery, so that the segments may be readily assembled end to end.

What I claim is:—

1. In open cure vulcanizing apparatus for use in making tire-shoes, the combination of an annular tire-shoe supporting mandrel with a transversely solid, circumferentially segmental bead-supporting annulus fitting within the mandrel, projecting laterally on both sides of the mandrel, and having outwardly extending bead-receiving flanges; a pair of lateral wrapping-compression rings, each having an inward annular flange the inner extension of which is slightly greater than the outer diameter of the flanges of the bead-supporting annulus to permit the passage of wrapping material between the outer edges of the latter, and inner wall of the former, flanges; and a wrapping of fibrous material tubularly inclosing the bead-supporting ring and the mandrel; the sides of the segmental bead-supporting ring holding the part of the wrapping in contact with it removed from the mandrel for initial engagement by the inwardly projecting flanges of the wrapping-compression rings.

2. The combination of an annular, tire-shoe supporting mandrel with an interiorly fitting, transversely solid but circumferentially segmental bead-supporting ring having outwardly extending side flanges thickened at their outer edges to form bearing surfaces for a fibrous wrapping; a pair of wrapping compression, side rings each having an annular inner flange adapted to pass over the bearing surfaces of the flanges of the bead-supporting ring; and means for moving the side rings toward and from the sides of the bead-supporting ring.

3. The combination of an annular tire-shoe supporting mandrel with an interiorly fitting, transversely solid but circumferentially segmental bead-supporting ring, each segment having an outwardly extending flange; a tubular wrapping; and means for tensioning the wrapping.

4. The combination of an annular mandrel with an interiorly contained, circumferentially segmental, outwardly flanged ring the segments whereof are transversely solid; a pair of laterally movable side rings having inwardly projecting flanges the interior extensions whereof are greater than the exterior extension of the segmental ring; and means for actuating the side rings.

In testimony whereof I have affixed my signature in presence of two witnesses.

ROBERT ROWLEY.

Witnesses:
EDWARD E. BLACK,
F. E. NARES.